May 11, 1965

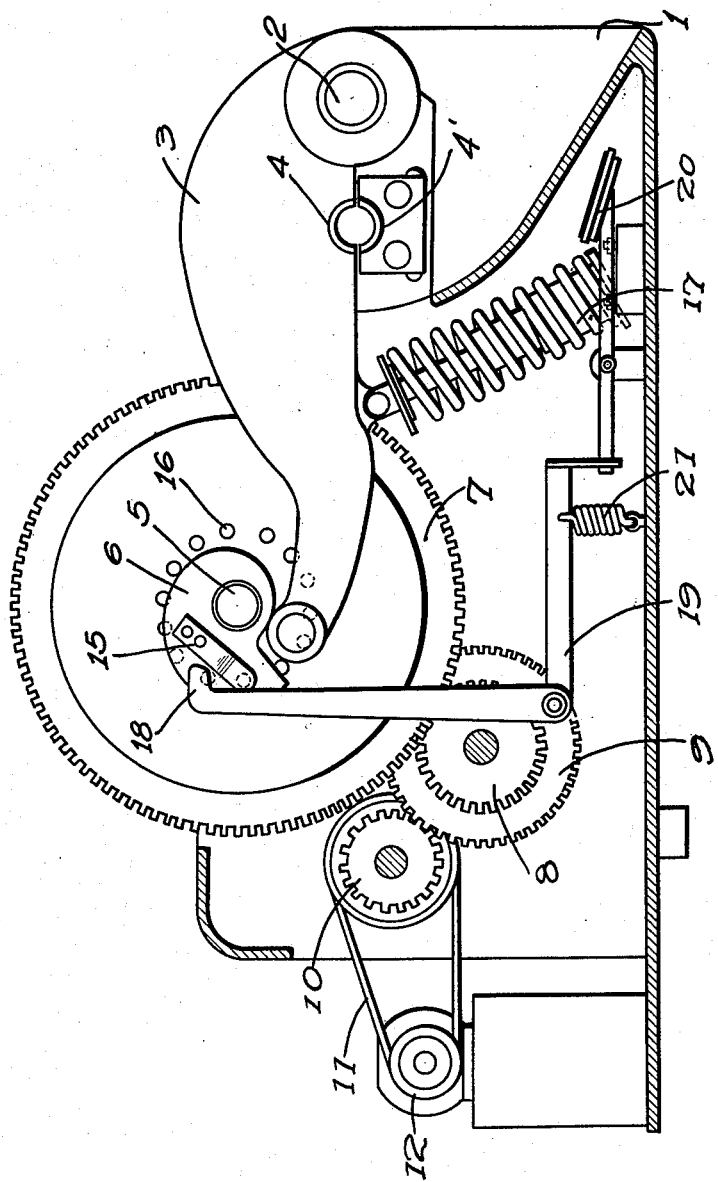

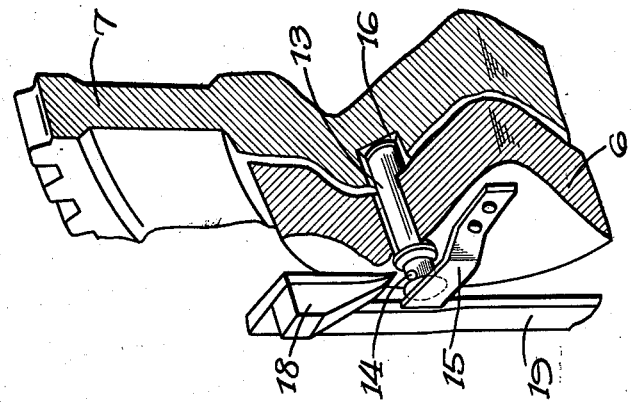
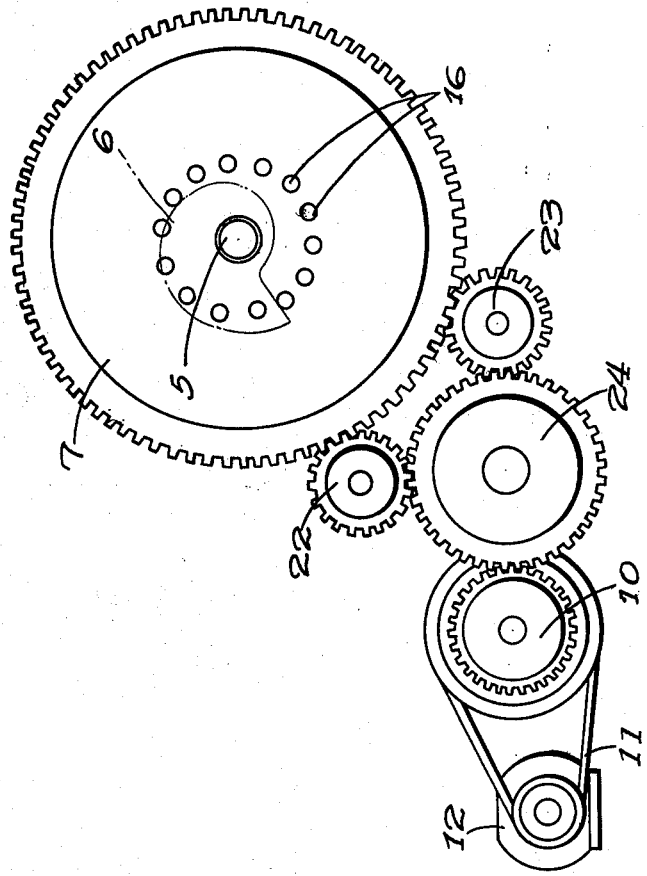

SHOZO SHIOKAWA 3,182,543

SHEARING MACHINE

Filed Aug. 14, 1962

INVENTOR.

BY Shozo Shiokawa

United States Patent Office 3,182,543
Patented May 11, 1965

3,182,543
SHEARING MACHINE
Shozo Shiokawa, 28 2-chome, Nishimachi, Sone,
Toyonakashi, Osaka Prefecture, Japan
Filed Aug. 14, 1962, Ser. No. 216,814
Claims priority, application Japan, July 11, 1962,
37/29,618
6 Claims. (Cl. 83—573)

This invention relates to stock shearing machines and, more particularly, to a novel, simplified, efficient and rugged stock shearing machine.

Conventional stock shearing machines are usually of the type in which the shearing cutters are operated by means of cranks or eccentrics, and in which power transmission through the crank is effected unevenly during one-half of a revolution of the crank. Consequently, whenever a greater shearing force is required, all of the compounds of the stock shearing machine, including the frame, crank, gears and the like must be made larger and stronger. The efficiency of such machines, particularly when used in a continuous shearing operation, is rather low because the return cycle of the shearing cutter requires as much time as the operating stroke thereof.

An object of the present invention is to provide a stock shearing machine of high capacity, but very simple construction.

A further object of the invention is to provide such a stock shearing machine in which the return stroke of the shearing bar requires only a minute fraction of the time required for operating or working stroke thereof.

In accordance with the present invention, the stock shearing machine comprises a main frame on which is supported a shaft rotatably mounting a main relatively large diameter drive gear. In spaced relation to, and parallel with this first mentioned shaft, there is a second shaft which oscillatably supports a shearing arm which is spring biased in one direction. This shearing arm has a free end which is engaged with an involute cam which is rotatable on the same axis as the main drive gear. This involute cam is provide with a connecting pin spaced at a selected radial distance from the axis of the shaft carrying the main driving gear and the involute cam, and this pin is spring biased to engage into any one of a plurality of apertures in the main gear and arranged around a circle having the same radius as the radial distance of the spring biased pin from the axis of the main shaft.

Suitable gearing is provided to continuously rotate the main gear from a relatively small electric motor. A manual control device is provided having means engageable with the spring biased pin of the involute cam, and this manual control is normally biased to a position in which it retracts the spring biased pin from engagement with an aperture in the main drive gear so that the involute cam is effectively disconnected or uncoupled from the main drive gear. When the manual control device is operated, it releases the spring biased pin to engage in one of the apertures in the main drive gear and thus connects the involute cam for rotation by the main drive gear. The involute cam, operating with smooth motion on the free end of the shearing arm, gradually forces the same in a working direction to make the cut, and when the free end of the shear arm reaches the largest diameter cam surface portion of the involute cam, it rides off this surface and abruptly drops back to the smallest diameter portion of the involute cam, under the influence of a powerful return spring. This return action occupies only a minute fraction of the time required for the involute cam to move the shear arm in a working direction.

The shear arm is formed with a shearing surface which mates with a shearing surface supported on the main frame, and novel means are provided at the mounting of the shear arm on its shaft whereby the shear arm may be accurately adjusted, in a direction axially of its supporting shaft, to assure accurate alignment of the shear portion on the shear arm and the cutting edge on the frame. To provide effective power for rotating the main gear, a reduction gearing is driven by the motor and includes an output gear which meshes with a pair of pinions, both of which mesh with the main gear. Thereby, the forces transmitted to the main gear are transmitted through a pair of pinions so that the stress on any one pinion is very substantially reduced.

For an understanding of the principles of the invention, reference is made to the following description of a typical embodiment thereof as illustrated in the accompanying drawings.

In the drawings:

FIG. 1 is a side elevation view, partly in section, of a stock shearing apparatus embodying the invention;

FIG. 2 is a partial perspective view, partially in section, illustrating the spring biased pin for coupling the involute cam to the main drive gear, and the manually controlled means for normally retracting the spring biased pin;

FIG. 3 is a side elevation view illustrating an alternative gear train for driving the main gear;

Figure 4:
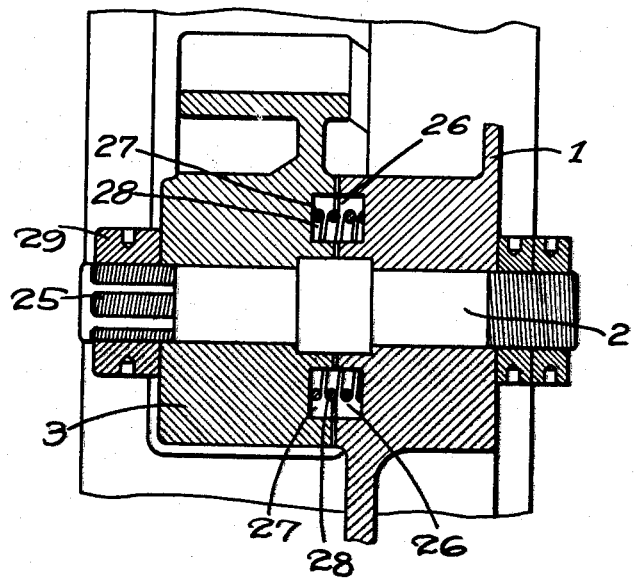
FIG. 4 is a sectional view through the mounting of the shear arm on its support shaft and illustrating the means for adjusting the shear arm axially of its support shaft.

Referring to FIG. 1, the stock shearing apparatus comprises a main base 1 on which there is supported a shaft 2 for oscillatably mounting a shear arm 3. Shear arm 3 is provided with a cutting or shearing edge portion 4, which mates correspondingly with a fixed cutting or shearing edge portion 4' secured to the frame 1. A main shaft 5 is mounted on frame 1 in spaced parallel relation to shaft 2 and rotatably supports an involute cam 6 and a main drive gear 7. The free end of arm 3 carries a roller or the like engageable with the involute surface of the cam 6.

As referring to FIG. 1, the main drive gear 7 meshes with a pinion 8 secured to rotate with a gear 9 meshing with a pinion 10 which is driven by a belt 11 from a small electric motor 12 mounted on the frame 1.

As best seen in FIG. 2, the involute cam 6 has an elongated aperture therethrough slidably receiving a pin 13 having its outer end formed with a circumferential recess 14, and the convex head of the pin 13 is engaged by the free end of a leaf spring 15 anchored to the involute cam 6. Pin 13 is at a selected radial distance from the axis of shaft 5, and arranged around a circle having the same radius as the radial distance of pin 13 from the axis of shaft 5, there is a series of openings or recesses 16 in the main drive gear 7, each arranged to be engaged by pin 13 under the influence of leaf spring 15. A relatively large and powerful coil spring 17 biases arm 3 in a direction to maintain its free end engaged with the involute cam 6.

A manual control mechanism is provided for coupling and uncoupling the involute cam 6 relative to the drive gear 7. As illustrated in particular in FIGS. 1 and 2, this manual control means includes a wedge 18 mounted on the free end of arm 19 and arranged to engage in the circumferential recess 14 in the outer end of the pin 13. Arm 19 is operated by a treadle or pedal 20, and a spring 21 normally biases the arm 19 in a direction such that the wedge 18 engages fully into the annular recess in pin 13 and withdraws pin 13 from a recess 16 in gear 7 and against the biasing action of spring 15. Thus, pin 13 is normally retracted from a recess 16 so that cam 6 is uncoupled from drive gear 7.

When it is desired to perform a shearing operation, the stock is inserted between the cutting edges 4 and 4' and lever or treadle 20 is depressed. This moves the arm 19 and wedge 18 upwardly with the wedge 18 disengaging the annular portion of the spring 13. Under the influence of spring 15, pin 13 is engaged in a recess 16 of gear 7 so that involute cam 6 is now coupled to the gear and rotates in a clockwise direction as viewed in FIG. 1. This gradually forces down the free end of arm 3 with a steady pressure to effect the cutting operation on the stock inserted between the cutting edges 4 and 4'. As the free end of arm 3 reaches the largest diameter portion of involute arm 6, it abruptly drops back, under the influence of spring 17, to the smallest diameter portion of the cam 6, thereby making the return stroke of arm 3 which is in an upward direction. It will be noted that this return stroke will require only a minute fraction of the time required for the working or downward stroke of the arm 3. At the same time, and providing the pedal 20 has been released, the wedge 18 will re-engage the annular portion 14 of pin 13 and will retract pin 13 from a recess 16 to uncouple cam 6 from gear 7, with the parts remaining in essentially the position of FIG. 1. However, if treadle 20 is maintained depressed, the shearing operation of arm 3 will be cyclically repeated as long as cam 6 remains coupled to the drive gear 7.

FIG. 3 illustrates a gear train particularly effective for transmitting large torques to the drive gear 7. In this case, the gear 10, driven by the motor 12 through the belt drive 11, meshes with a gear 24. This gear 24 has meshing therewith a pair of pinions 22 and 23, each of which meshes with the main drive gear 7. The torque supplied by the reduction gearings is thereby transmitted through the pair of pinions 22 and 23 to the gear 7, so that the stress on each of the transmitting pinions is reduced in half as compared to its value if only a single pinion were engaged between gear 24 and main drive gear 7.

Figure 5:
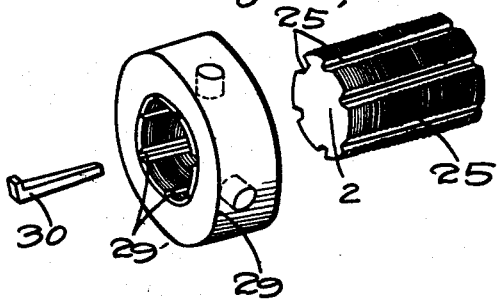
FIG. 5 is an exploded perspective view of a nut and key arrangement for effecting axial adjustment of the shear arm along its support shaft and for retaining the shear arm assembled with its support shaft.

FIGS. 4 and 5 illustrate an arrangement whereby the position of shear arm 3 may be adjusted axially of the support 2 to obtain an accurate alignment of the cutting edges 4 and 4'. Referring to FIGS. 4 and 5, the end of shaft 2 is threaded, as at 25, and is likewise formed with a plurality of circumferentially spaced and longitudinally extending peripheral grooves 25'. The portion of frame 1 supporting the shaft 2 is formed with an annular recess 26 concentric with shaft 2 and facing an annular recess 27 in the arm 3. The two annular recesses 26 and 27 receive a coil spring 28 which tends to bias the arm 3 to the left as viewed in FIG. 4. Such movement to the left is restrained by a nut 29 which is threaded onto the threaded portion of shaft 25. This nut 29 is formed with a plurality of circumferentially spaced and longitudinally extending grooves 29' in its inner surface. The number of grooves 25' differs from the number of grooves 29' by a prime whole number such as 1, 3, or the like. The grooves 25' and 29' cooperatively receive a pin or key 30. Thereby, when it is desired to adjust the axial position of arm 3 along its support shaft 2, the nut 29 may be rotated in one direction or the other, and when an accurate alignment of cutting edges 4 and 4' is attained, the key 30 may be engaged in a pair of then aligned grooves 25' and 29' to lock nut 29 in its adjusted position. Thereby a very accurate adjustment of arm 3 axially of its support shaft 2 may be obtained and maintained.

As compared with known shearing machines of the type mentioned above, the present invention has the advantage that the cam 6 maintains a steady pressure on the free end arm 3 during about three quarters of a revolution of gear 7, after which the pressure is released for the arm 3 to move into the position shown in FIG. 1. There is a very short dwell period between shearing strokes, thus resulting in a rapid and efficient shearing operation which is especially advantageous for continuous shearing operations. The provision of the involute cam 6, together with the provision of the special gearing shown in FIG. 2 and involving the pair of force transmitting pinions 22 and 23, makes possible the use of a much smaller drive motor 12 than would be required for a machine having an equivalent shearing force.

While a specific embodiment of the invention has been shown and described in detail to illustrate the application of the principles of the invention, it will be understood that the invention may be embodied otherwise without departing from such principles.

I claim:

1. Stock shearing apparatus comprising, in combination, a frame; a first cutting jaw fixed to said frame; a relatively massive shear arm pivoted at one end to said frame for oscillation about a first axis, and having a free end; a second cutting jaw carried by said arm nearer to its pivot end and having stock shearing cooperation with said first jaw; a main gear mounted on said frame for rotation about a second axis substantially parallel to said first axis and adjacent the free end of said arm; a cam axially juxtaposed to said main gear for rotation about said second axis, said cam being engaged by the free end of said arm and having an involute working stroke surface and a general radial return stroke surface; means biasing the free end of said arm to engage said cam; driving means for rotating said main gear; spring biased detent means normally coupling said cam to said main gear for rotation by the latter to operate said arm; manually actuable control means effective on said detent means to uncouple said cam from said main gear; and means normally biasing said control means to a position uncoupling said cam from said main gear; said control means, upon manual actuation thereof, being released from said detent means for spring biasing of the latter to a position coupling said cam to said main gear for rotation by the latter to operate said shear arm.

2. Stock shearing apparatus, as claimed in claim 1, in which said spring biased detent means comprises a pin slidably mounted through said cam at a selected radial distance from said second axis, and a series of recesses in said main gear engageable by the free end of said pin to couple said cam to said gear, said recesses being circumferentially spaced around a circle having a radius equal to said selected radial distance; the means spring biasing said detent means comprising a leaf spring secured to the outer surface of said cam and engaged with a projecting end of said pin to bias the same into engagement in one of said recesses.

3. Stock shearing apparatus, as claimed in claim 2, in which the outwardly projecting end of said pin is formed with a circumferential recess; said manually actuable control means including a wedge engageable in said circumferential recess, and said biasing means for said manually actuable control means being connnected to said wedge to move the same in a direction to operate on said annular recess to withdraw said pin from engagement with one of said recesses in said main gear.

4. Stock shearing apparatus, as claimed in claim 1, in which said driving means includes a prime mover operating reduction gearing, said reduction gearing having an output gear; said driving means further including a pair of pinions each meshing with said output gear and with said main gear, whereby the forces on said main gear are divided between said pair of pinions.

5. Stock shearing apparatus, as claimed in claim 1, including means operable to adjust said arm axially of its axis of oscillation for precise alignment of said first and second cutting jaws.

6. Stock shearing apparatus, as claimed in claim 5, in which said shear arm is mounted on a shaft; said shaft having a threaded end; a nut threaded onto said threaded end and engaging said shear arm; means biasing said shear arm into engagement with said nut; the threaded portion of said shaft being formed with a plurality of circumferentially uniformly spaced longitudinally extending slots; the inner periphery of said nut being formed with a plurality of circumferentially uniformly spaced longitudinally extending slots; the number of slots on said shaft and the number in said nut differing by a prime whole number; and a key conjointly engageable in a slot on said shaft and a slot in said nut.

References Cited by the Examiner
UNITED STATES PATENTS

| | | | |
|---|---|---|---|
| 101,220 | 3/70 | Booth | 83—608 |
| 838,675 | 12/06 | White | 83—602 |
| 1,597,138 | 8/26 | Zimmer | 83—573 |
| 2,370,002 | 2/45 | Brecht | 74—410 |
| 2,517,447 | 8/50 | Sachs | 83—602 |
| 2,903,895 | 9/59 | Larsen | 83—602 |
| 3,039,344 | 6/62 | Hercik | 83—602 |
| 3,073,200 | 1/63 | Hercik | 83—602 |

ANDREW R. JUHASZ, *Primary Examiner.*